(12) United States Patent
Gibson et al.

(10) Patent No.: US 6,270,662 B1
(45) Date of Patent: Aug. 7, 2001

(54) DRAIN BASIN FILTER INSERT SYSTEM

(75) Inventors: Darrell James Gibson, 3350 S. Lambert St., Eugene, OR (US) 97405; Clifford D. Weston, Tigard, OR (US)

(73) Assignees: Darrell James Gibson; Lisa Gibson, both of Eugene, OR (US)

( * ) Notice: Subject to any disclaimer, the term of this patent is extended or adjusted under 35 U.S.C. 154(b) by 0 days.

(21) Appl. No.: 09/585,673

(22) Filed: Jun. 1, 2000

(51) Int. Cl.$^7$ .................. E02F 5/16; E02F 5/14; B01D 35/02; B01D 24/22; C02F 1/28
(52) U.S. Cl. .............. 210/163; 210/166; 210/474; 210/484; 210/485
(58) Field of Search ................... 210/163, 164, 210/166, 170, 474, 484, 485; 404/4

(56) References Cited

U.S. PATENT DOCUMENTS

| | | | |
|---|---|---|---|
| 1,471,819 | * | 10/1923 | Bauschard . |
| 5,297,367 | * | 3/1994 | Sainz . |
| 5,391,295 | * | 2/1995 | Wilcox et al. . |
| 5,720,574 | * | 2/1998 | Barella . |
| 6,080,307 | * | 6/2000 | Morris et al. . |
| 6,086,758 | * | 7/2000 | Schilling et al. . |
| 6,093,314 | * | 7/2000 | Wilson et al. . |

FOREIGN PATENT DOCUMENTS

98/40572 * 9/1998 (WO) .

OTHER PUBLICATIONS

Wester's New World Dictionary—3rd College Edition @ 1988 Simon & Shuster Inc. p. 370—definition of "depressed".*

* cited by examiner

Primary Examiner—Thomas M. Lithgow
(74) Attorney, Agent, or Firm—Marger Johnson & McCollom, P.C.

(57) ABSTRACT

An insert for use in a drain basin, comprising an outer wall defining a periphery of the insert and having a top edge and a bottom edge. A perforated bottom surface extends across the lower periphery of the insert. A filter, resting on the perforated bottom surface, has a peripheral edge enclosing a central portion. A flange extends inwardly from the top edge of the outer wall past the peripheral edge of the filter. The flange directs drainage water past the periphery of the filter and to its more central portion, whereupon impurities within the drainage water are extracted and filtered water exits through the perforated bottom surface into the drain basin. In a preferred embodiment of the invention, the inward-extending flanges are angled downward toward the filter. In a second embodiment, the filter, bottom surface and inward-extending flanges are arranged in a cartridge, which is removably placed inside the periphery of the outer wall.

25 Claims, 5 Drawing Sheets

DRAIN BASIN FILTER INSERT SYSTEM

BACKGROUND OF THE INVENTION

This application relates generally to drainage structures and associated hardware, and more specifically to an improved contaminant-absorbing filter insert system for use in connection with new or existing water drainage inlets to collect drainage water contaminants such as hydrocarbons and the like while permitting the undisturbed passage of the water.

Drainage structures such as drain inlets for sidewalks, roads and parking lots are well known and in widespread use. Such structures generally provide a path for the removal of rainwater, irrigation water, or the like that would otherwise accumulate on the ground surface. Water thus drained from the surface by these structures is usually carried to a lake, stream or other body of water. Over time, undesirable and sometimes harmful chemical materials, e.g., oil, fuel, antifreeze and the like, collect on the ground surface and can be transported by the drainage system to contaminate these bodies of water.

Drainage structures are also commonly used in indoor facilities, including automotive service areas, parking structures, industrial shops, restaurants, and residential basements and garages. Hydrocarbons and other chemicals are often deposited on the ground during commercial activities at, for example, automotive service and industrial facilities. To a lesser extent, contaminants accumulate on the ground in residential as well as commercial parking structures. Upon surface cleaning, these chemicals are subsequently transported along with the drainage water as with street or parking lot drains. Unless filtered out of the drainage water, contaminating material is carried with the drainage water to the ultimate drainage location.

Prior art filtering devices extract contaminants through the placement of an insert into a storm basin. For example, the Barella device (U.S. Pat. No. 5,720,574) is a square trough-shaped filter insert device for placement into a storm drain basin. Filtration material is placed above a perforated bottom surface of the trough. Run-off water contacts the filtration material; contaminants are filtered out and the filtered water passes through the perforated bottom surface and through to the remainder of the water-directing system. However, some of the drainage water is able to enter the device and pass down its outer wall and through the perforated bottom surface, such that it avoids substantial contact with the filter means and thereby escapes filtration.

Accordingly, a need exists for a greater degree of filtration of hydrocarbons and other contaminants from drainage water, preventing environmental damage while facilitating the economical and functionally efficient drainage of run-off waters.

SUMMARY OF THE INVENTION

The contaminant-absorbing catch basin filter insert system of this invention provides an improved structure for use in connection with new or existing water drainage inlets. It enables the collection of contaminants, such as hydrocarbons and the like, while permitting the passage of the drainage water.

The insert has an outer wall defining a periphery of the insert and having a top edge and a bottom edge. A perforated bottom surface extends across the lower periphery of the insert. A filter, resting on the perforated bottom surface, has a peripheral edge enclosing a central portion. A flange extends inwardly from the top edge of the outer wall past the peripheral edge of the filter. The flange directs drainage water past the periphery of the filter and to its more central portion, whereupon impurities within the drainage water are extracted and filtered water exits through the perforated bottom surface into the drain basin. In a preferred embodiment of the invention, the inward-extending flanges are angled downward toward the filter. In a second embodiment, the filter, bottom surface and flanges are arranged in a cartridge, which is removably placed inside the periphery of the outer wall.

The foregoing and other objects, features and advantages of the invention will become more readily apparent from the following detailed description of a preferred embodiment of the invention that proceeds with reference to the accompanying drawings.

DETAILED DESCRIPTION

Figure 1:
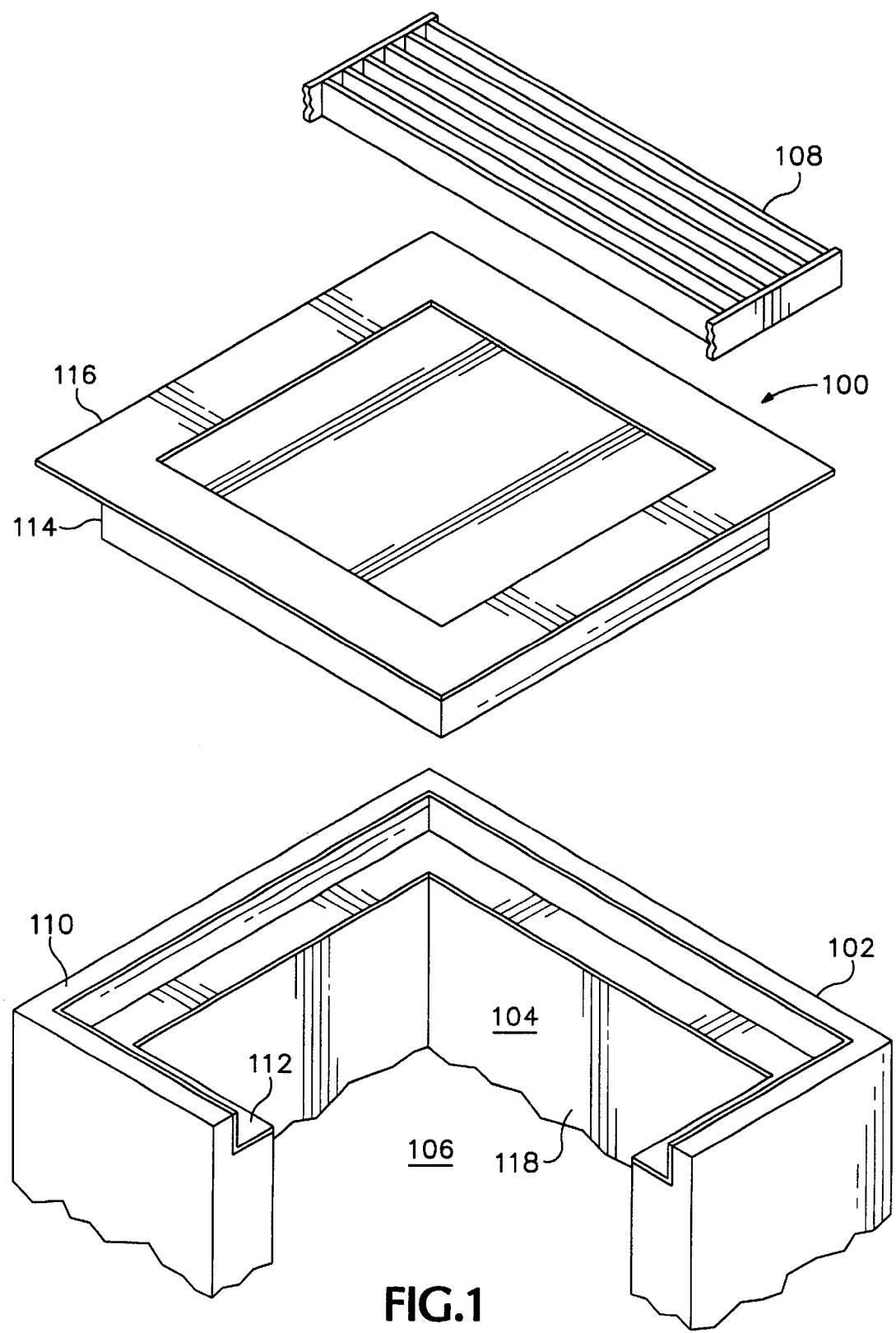
FIG. 1 shows an exploded perspective view of the drain basin filter insert system constructed according to the invention installed within a typical storm drain.

The filter insert system 100 according to the present invention is shown generally in exploded view in FIG. 1. The invention is designed to be placed into a storm drain or floor drain basin. A typical storm drain is comprised of a drain basin 102 having a mouth 104 and an exit aperture 106 communicating with the remainder of the water drainage system (not shown). A grate 108 covers the basin mouth 104 and is commonly maintained at substantially ground surface level 110. The grate or screen 108 is supported within the basin by a recessed peripheral ledge 112. In most cases, the grate 108 covers the mouth 104 of the drain to prevent debris from entering and being carried through or clogging the drain basin or exit aperture 106. A floor drain (see, e.g., FIG. 2), commonly circular or rectangular, possesses a similar structure but is generally constructed for lower-demand use conditions. The inventive filter insert system can be manufactured to fit the various sizes and shapes of rectangular and circular water drainage inlets but is not limited thereto.

The filter insert 100 includes an outer wall portion 114 and preferably includes a peripheral support means for positioning the device below surface level in a drain basin. The means may include, as illustrated, a set of perpendicular support flanges or lips 116 ("support flanges") attached to and projecting outward from the top edge 302 (FIG. 3) of at least two of the outer walls 114. When installed in a storm drain basin 102, the support flanges 116 rest on the basin's recessed ledge 112. A ground-level grate 108 would, in most applications, rest on the support flanges 116. Alternatively, the system can be implemented without support flanges, for use in drain inlets that do not have grate-bearing surfaces 112. In these installations, the outer walls 114 of the filter system can be directly secured to the inside walls 118 of the inlet structure using clips, bolts, or an equivalent fastening method. Alternatively, the filter system can be positioned in such inlets by using a mechanical support placed below the inserted system in the basin.

Figure 2:
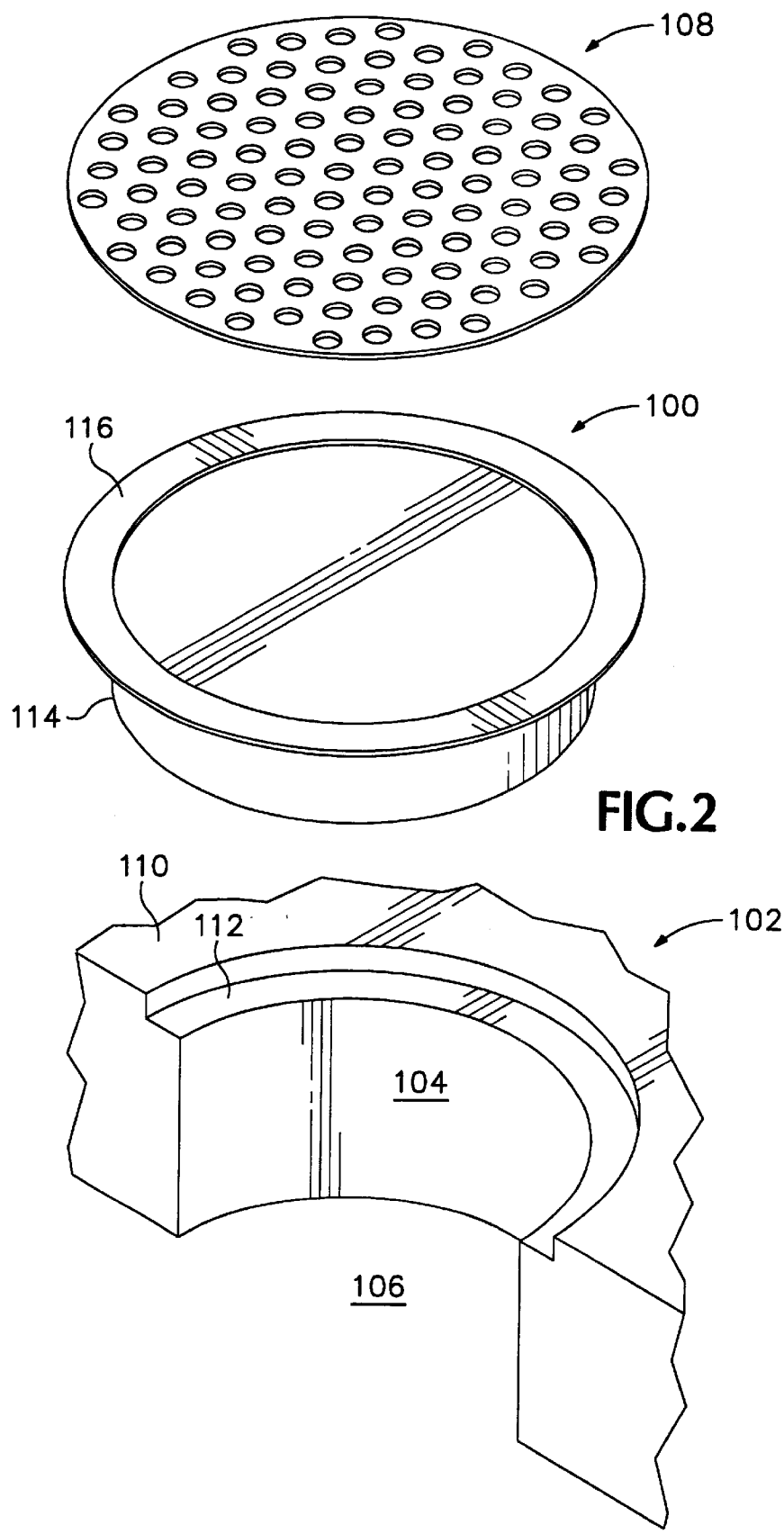
FIG. 2 shows an exploded perspective view of the drain basin filter insert system constructed according to the invention installed within a typical floor drain.

FIG. 2 shows an embodiment of the present invention as used in a circular drain of the type commonly found in indoor installations, such as in residential basement or commercial automotive service area floors. Typically, the basin mouth 104 and exit aperture 106 are smaller than the corresponding elements of a storm or other street drain basin. The embodiment as depicted has a circular outer wall 114 and peripheral support means in the form of support flanges 116. The support flanges 116, when employed as the peripheral support means, rest on the grate-bearing surfaces 112 of the drain basin 102 and under the surface-level grate 108.

Figure 3:
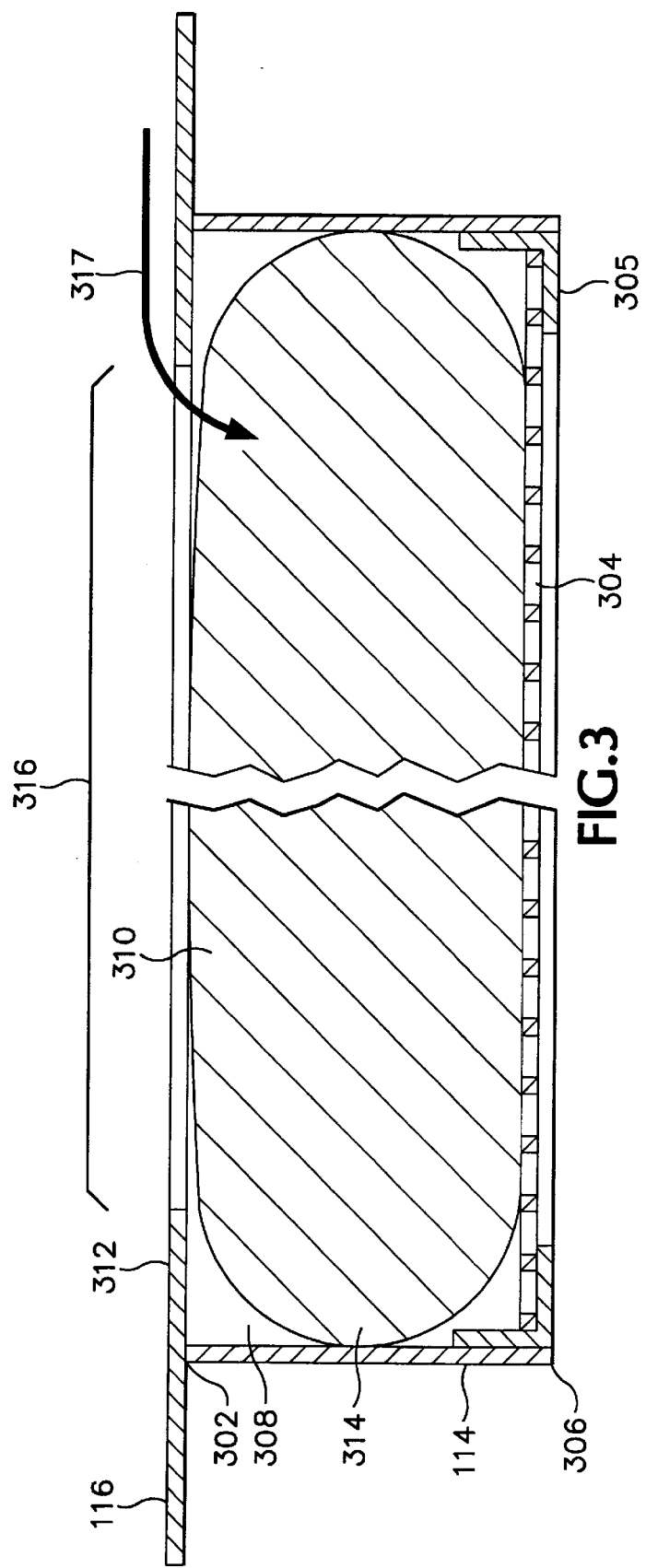
FIG. 3 shows a sectional view of a side elevation of the drain basin filter insert of FIG. 1.

FIG. 3 shows in greater detail the structural elements of the present invention. A bottom surface 304, of mesh or other perforate construction, is positioned substantially in a plane defined by the lower edges 306 of the outer walls 114. The bottom surface 304 may be directly attached to the to the outer wall 114. Alternatively, tabs 305 or other support flanges may be employed to position the bottom surface 304. Together, the outer walls and perforated bottom surface define a chamber 308 into which a filter means 310 is removably placed. The filter means 310 may be a quantity of loose filter material or a filter medium-filled fluid-permeable "sock" or "pillow". Loose filter media material may be covered with a media restrainer such as a screen or bracket (not shown), which would be placed above the filter means 310. Such media restrainers are known to and used by those skilled in the art.

A third set of flanges 312 ("inner flanges") project inward above and over the periphery 314 of the filter means 310. At least part of each inner flange 312 rests in essentially the same plane as that defined by the top edge 302 of the outer wall portion 114. The inner flanges 312 direct draining water directly onto and toward the center (shown by the bracketed more central portion 316) of the filter means 310. This improvement over the prior art results in a greater percentage of the water flowing over flange 112 as along the arrow 317 and contacting the filter means 310 and increases the efficacy of the contaminant filtration.

Figure 4:
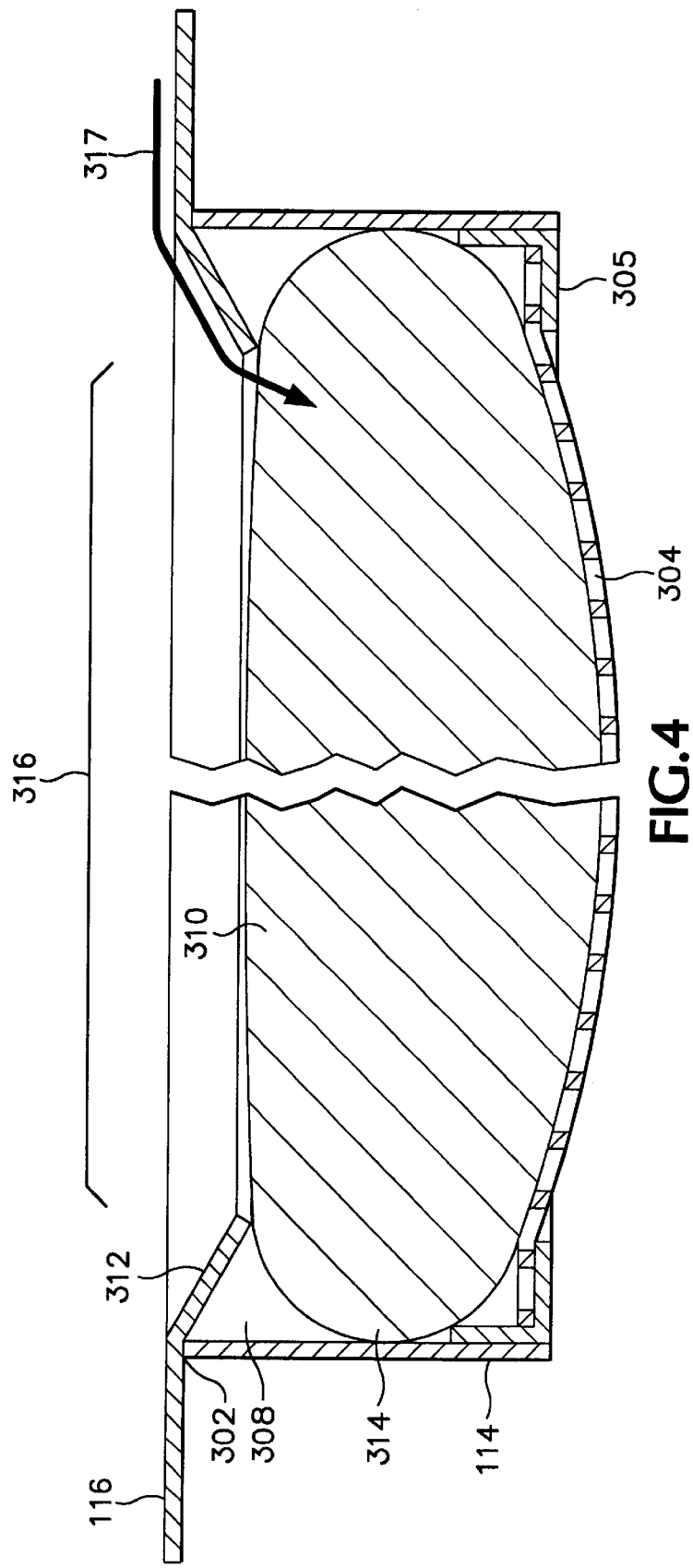
FIG. 4 shows a sectional view of an alternative embodiment of the invention, in which the inner flanges are angled downward toward the filter means and the bottom perforated surface is concave.

FIG. 4 shows an alternative embodiment of the present invention in which the inner flanges 312 are slanted downward out of the plane of ground level and toward the filter means. The sloping inner flanges 312 improve the guidance of drainage water into the drain insert 100 and, more specifically, into direct contact with the filter means 310. The enhancement in drain water guidance results in more optimal filtration and increased efficiency of the device over the prior art. For example, in the Barella '574 device as practiced with a filter medium-filled "sock", water can flow into the device and directly along its outer walls to the perforated bottom surface, bypassing the filter means. By contrast, the inward-projecting flanges 312 of the present invention direct drainage water medial of the outer walls 114 as along path 317 so that it falls onto the more central portion 316 of the filter means 310 in the chamber 308 of the inventive apparatus. This inward water guidance reduces bypass of the filtering means and improves the degree of drainage water filtration over the previous art. It has been found that angling the inner flanges 312 downward maximizes this water-guiding effect. The effect of this angling is realized with flange deflections of as little as about 5 degrees. As the inner flanges 312 approach vertical, the guidance of water onto the central portion of the filter means 310 diminishes. The maximum downward angle which provides useful inward water guidance is about 60 degrees. By directing water onto the centralmost portion 316 of the filter means 310 and preventing water from avoiding the filter means 310, the present invention maximizes the percentage of water filtered and decreases the amount of contaminating materials delivered by the drainage water to downstream drainage locations.

The perforated bottom surface 304 is, in this alternative embodiment according to the present invention, of a concave shape. Concavity of the bottom surface 304 increases the volume of filtering media 310 which can be placed in the insert device. Enlarging the volume of filter media 310 improves the filtration of drainage water and increases the time period between filter means replacements. Further, a concave bottom perforated surface results in the filter media having a greater depth in the central portion 316 than at its periphery 314. Water directed by the inner flanges toward the central portion of the filter media must pass through this thicker portion of filter media, thereby enhancing filtration.

By overhanging the periphery of the filter means 310, drainage water is guided, as indicated by the black arrows 317, onto the more central portion 316 of the filter means 310 rather than its periphery 314. The beneficial action of the inner flanges 312 is to prevent drainage water from running down the outer walls 114, passing through the insert 100 and drain basin 102 while avoiding the filter means 310. Enhanced downward and central guidance of drainage water is represented in FIG. 4, in which the inner flanges 312 are shown angled downward toward the filter means 310 at approximately 45 degrees. This slope permits better collection of drainage water down and into the basin insert. At the same time, the sloped inner flanges 312 still guide the water toward the center portion 316 and away from the periphery 314 of the filter means 310, preventing water from following the outer walls 114 and failing to contact the filter means 310.

Figure 5:
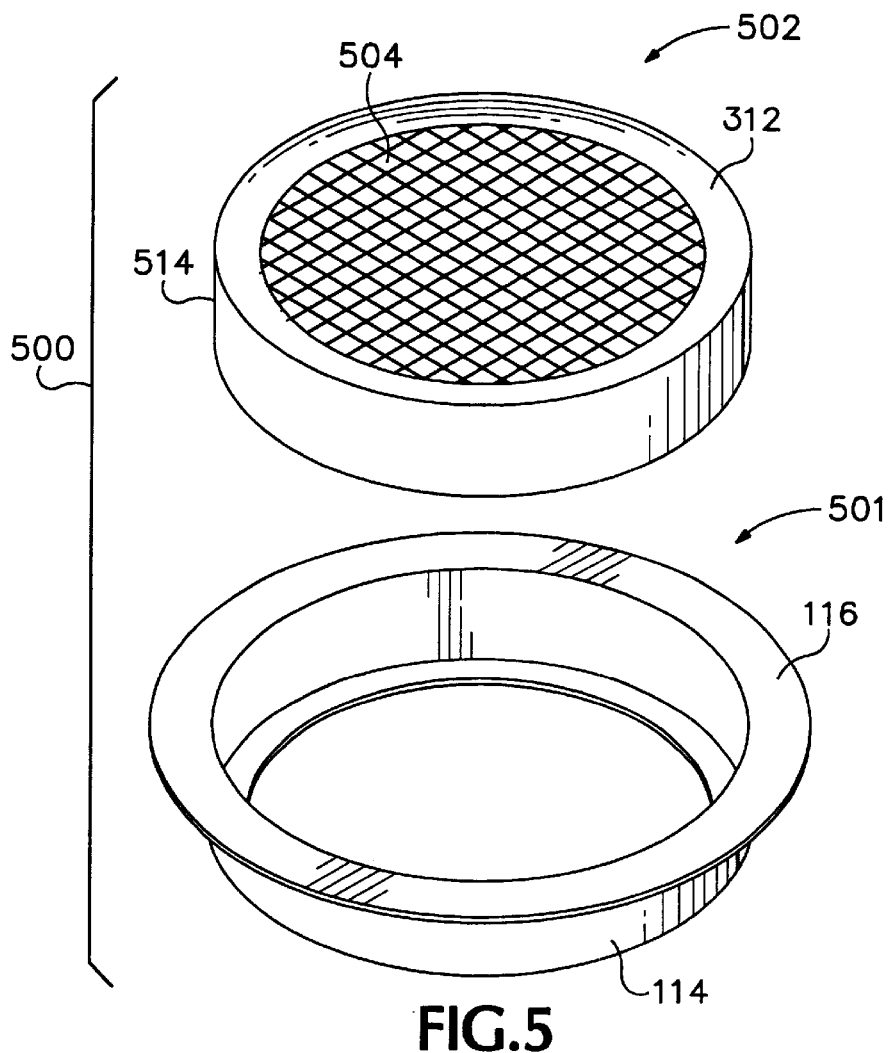
FIG. 5 shows an exploded perspective view of a second embodiment of the present invention of FIG. 2, in which the drain basin filter insert system includes an outer frame and a filter cartridge.
Figure 6:
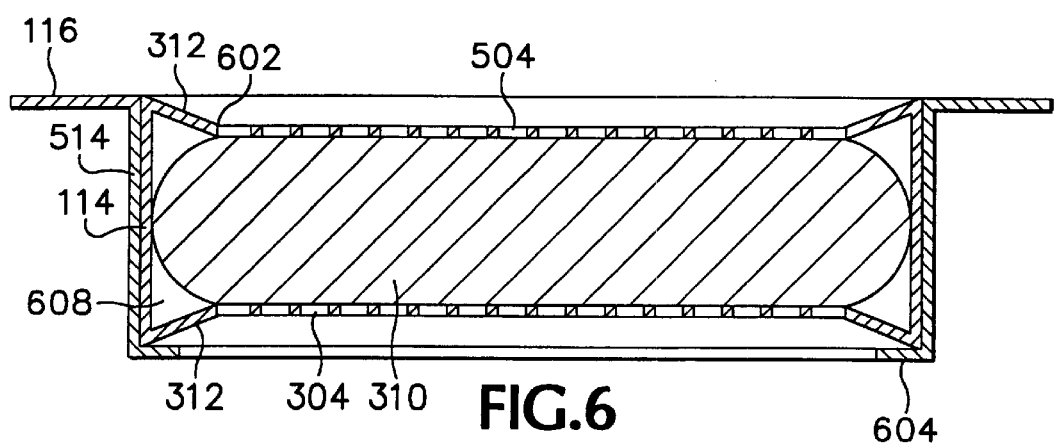
FIG. 6 shows a sectional view of side elevation of an alternative cartridge embodiment of the filter insert system of FIG. 5, in which the filter cartridge inner flanges have been angled inward toward the filter means.

The filter insert system is installed into a drain basin by removing the inlet grate and lacing the filter system inside of the basin, with the support flange resting on the bearing surfaces or grate seat that typically exist along the top edge of the basin. The support flanges, if present, are sized to the proper width of the grate seat but may be modified if necessary for the installation. As noted previously, the insert may alternative be supported within the basin using fastening means. The filter insert system is installed on the inside surface of a drainage structure so that drainage water that would normally flow directly through the drainage structure is caused instead to flow through the filtration element. Undesirable and toxic materials, that may otherwise be carried in the water, are removed while permitting the water itself to pass through to the ultimate drainage location.

Where the invention has thus far been described as comprising a unitary insert with a removable filter means, an alternative embodiment 500 implements an insert device of two pieces, an insert frame and a filter cartridge. FIG. 5 shows an exploded perspective view of this embodiment according to the invention. The outer wall portion 114 and peripheral support means 116 (here, support flanges) are arranged in a basin insert frame 501. The second piece of the embodiment is a removable filter cartridge 502 comprising a perforated bottom surface 304 (FIG. 6), inner flanges 312, and filter means 310 (FIG. 6), as described previously. A second peripheral wall 514 and perforated upper surface 504 combine with the perforated bottom surface 304 to form the interior of the cartridge chamber 608 (FIG. 6). A filter means 310 is housed within the cartridge chamber. The filter cartridge 502 is sized to fit closely into the basin insert frame 501. The insert frame 501 provides tabs or flanges 605 to position and support the filter cartridge 502.

FIG. 6 shows the same cartridge embodiment, further utilizing the angled inner flange feature. The perforated upper surface 504 is shown in the plane of the medial edge 602 of the inner flange 312; the upper surface 504 could alternatively be placed higher than this plane without affecting the function of the filter insert device 100.

The cartridge in FIG. 5 is illustrated with a particular orientation; as a substitute, the filter cartridge 502 can be arranged with inner flanges 312 on both its faces (FIG. 6). If so constructed, the filter cartridge 502 may be placed in the basin insert frame 501 with either surface acting as the upper surface. Inner flanges 312 would be arranged and function as described in the embodiments of FIGS. 3 and 4. An improvement of this embodiment is that employment of a cartridge provides filter means replaceability without the need to directly handle the filter means. Constructing the cartridge with inner flanges on both upper and bottom surfaces obviates its orientation in the basin insert frame and simplifies the installation of the present invention.

The filter insert system of the present invention can be made of many suitable materials, such as sheet metal. Alternatively, portions of the filter insert system (such as the cartridge of the embodiment described in FIGS. 5 and 6) can be constructed of polyethylene or similar high density synthetic materials. Such materials are currently known to and used by those skilled in the art. Selection of different materials allows for adaptation of the system to specific uses based on criteria such as strength, cost, suitability in various disposability schemes, and exposure and resistance to specific chemicals.

The filtration element material is preferably an approved collecting agent but can alternatively be any other filter medium which retains contaminants—i.e., oil, antifreeze, fuel, solvents or the like—while allowing water to flow through more or less directly. Specific filter media compositions are well-known to persons skilled in that art. For example, polypropylene strips, an inert inorganic blend of amorphous siliceous material containing sodium, potassium and aluminum silicates, in variable composition, and particulate perlite (U.S. Pat. No. 5,632,889) have been shown to be effective. The filter media is placed in the bottom of the trough, above the perforations in the trough, and can be retained there if necessary with clips or other retaining mechanisms to keep the filter from floating or otherwise moving. The filter media may be replaced on a periodic or otherwise as needed.

The filtration element is placed in the bottom of the insert, above the perforated bottom surface and can be immobilized if necessary with an upper perforated surface, by clips or using equivalent retaining mechanisms. The filter means may be replaced as necessary, to regenerate maximum filtration using the original insert device structure.

A person skilled in the art will be able to practice the present invention in view of the present description, where numerous details have been set forth in order to provide a more thorough understanding of the invention. In other instances, well-known features have not been described in detail in order not to obscure unnecessarily the invention.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. An insert for use in a drain basin, comprising:

an outer wall defining a periphery of the insert, said outer wall having a top edge and a bottom edge;

a concave perforated bottom surface extending across the periphery of the insert;

filter means resting on the perforated bottom surface having a peripheral edge enclosing a central portion; and a flange extending inwardly from the top edge of the outer wall past the peripheral edge of the filter means for directing drainage water out onto the central portion of the filter means, whereupon impurities within the drainage water are extracted and filtered water exits through the perforated bottom surface into the drain basin.

2. The insert according to claim 1, wherein the outer wall defines a rectangular periphery.

3. The insert according to claim 1, wherein the outer wall defines a circular periphery.

4. The insert according to claim 1, further comprising support means for retaining the insert within a drain basin.

5. The insert according to claim 4, wherein the support means includes an outwardly extending flange depending substantially transverse to the outer wall at the outer wall top edge, the outwardly extending flange having a support surface adapted to rest on a grate-bearing surface of the drain basin.

6. The insert according to claim 1, further comprising a filter retaining means.

7. The insert according to claim 6, wherein the filter retaining means is a perforated top surface arranged above the filter means and no higher than a plane defined by the top edge of the outer wall.

8. The insert according to claim 6, wherein the filter retaining means includes a perforated top surface arranged above the filter means and no higher than a plane defined by the top edge of the outer wall.

9. The insert according to claim 1, wherein the inward-projecting flange slopes downward at between about five and about sixty degrees toward the filter means.

10. The insert according to claim 1, wherein the filter means is thicker at a central portion than along a peripheral edge.

11. A drain basin insert for extracting impurities from drainage water, comprising:

an outer wall defining a rectangular periphery, said outer wall having a top edge and a bottom edge;

a concave perforated bottom surface extending across the periphery of the insert;

filter means resting on the perforated bottom surface;

an outwardly extending flange depending substantially transverse to the outer wall at the outer wall top edge, the outwardly extending flange having a support surface adapted to rest on a grate-bearing surface of a drain basin; and a flange inwardly extending from the top edge of the outer wall and out over the outermost portions of the filter means for directing drainage water onto the filter means, whereupon the filter means extracts impurities from the drainage water and filtered drainage water exits through the perforated bottom surface into the drain basin.

12. The insert according to claim 11, further comprising a filter retaining means.

13. The drain basin insert according to claim 11, wherein the inwardly-extending flange slopes downward toward the filter means.

14. The drain basin insert according to claim 13, wherein the inwardly-extending flange slopes downward toward the filter means at between about five and about sixty degrees.

15. The insert according to claim 11, wherein the filter means is thicker at a central portion than along a peripheral edge.

16. A drain basin insert system for extracting impurities from drainage water, comprising:
    a filter cartridge comprising:
        an outer cartridge wall defining a periphery, said outer wall having a top edge and a bottom edge;
        a perforated first surface extending across the periphery of the cartridge;
        a perforated second surface extending across the periphery of the cartridge;
        filter means between the perforated first and second surfaces;
        a flange inwardly extending from the top edge of the outer cartridge wall and out over the periphery of the filter means; and
        a flange inwardly extending from the bottom edge of the outer cartridge wall and out over the periphery of the filter means; and
    an insert frame comprising:
        an outer frame wall defining a periphery, said outer frame wall having a top edge and a bottom edge;
        support means for retaining the insert frame within the drain basin; and
        support means for retaining the filter cartridge within the insert frame.

17. The insert according to claim 16, wherein the outer cartridge wall and outer frame wall each define a rectangular periphery.

18. The insert according to claim 16, wherein the outer cartridge wall and outer frame wall each define a circular periphery.

19. The insert according to claim 16, wherein the support means includes an outwardly extending flange depending substantially transverse to the outer frame wall at the outer frame wall top edge, the outwardly extending flange having a support surface adapted to rest on a grate-bearing surface of the drain basin.

20. The insert according to claim 16, wherein the flange inwardly extending from the bottom edge of the outer cartridge wall is angled toward the filter means.

21. The drain basin insert according to claim 20, wherein the flange inwardly extending from the bottom edge of the outer cartridge wall is angled toward the filter means at between about five and about sixty degrees.

22. The insert according to claim 16, wherein the filter means is thicker at a central portion than along a peripheral edge.

23. A filter cartridge for use in a drain basin filter system, comprising:
    an outer cartridge wall defining a periphery, said outer wall having a top edge and a bottom, edge;
    a perforated first surface extending across the periphery of the cartridge;
    a perforated second surface extending across the periphery of the cartridge;
    filter means between the perforated first and second surfaces;
    a flange inwardly extending from the top edge of the outer cartridge wall and out over the periphery of the filter means; and
    a flange inwardly extending from the bottom edge of the outer cartridge wall and out over the periphery of the filter means.

24. The filter cartridge according to claim 23, wherein the flange inwardly extending from the bottom edge of the outer cartridge wall is angled toward the filter means.

25. The filter cartridge according to claim 24, wherein the flange inwardly extending from the bottom edge of the outer cartridge wall is angled toward the filter means at between about five and about sixty degrees.

* * * * *